Oct. 22, 1968     H. C. MAY     3,407,008
VACUUM PRESSURE CONTROL VALVE
Original Filed March 26, 1965
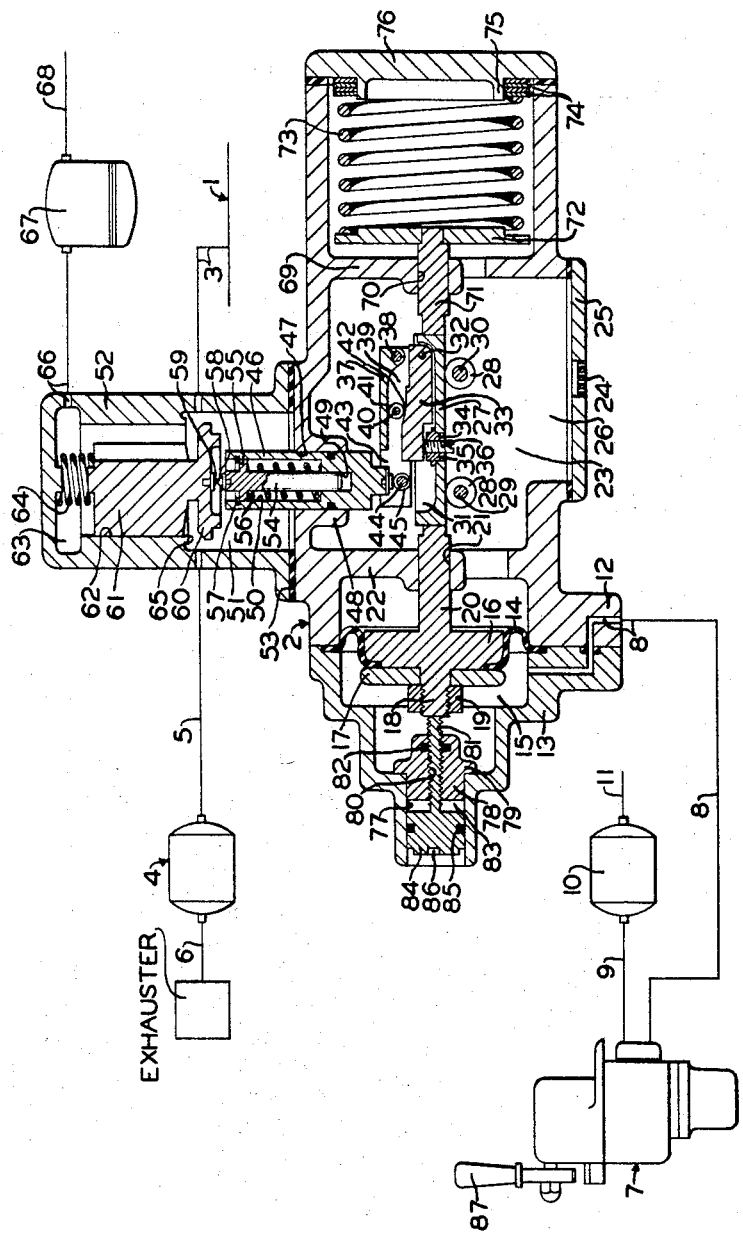
INVENTOR.
HARRY C. MAY
BY
*A. A. Steinmiller*
ATTORNEY United States Patent Office 3,407,008
Patented Oct. 22, 1968

3,407,008
VACUUM PRESSURE CONTROL VALVE
Harry C. May, McKeesport, Pa., assignor to Westinghouse Air Brake Company, Wilmerding, Pa., a corporation of Pennsylvania
Original application Mar. 26, 1965, Ser. No. 442,855, now Patent No. 3,272,563, dated Sept. 13, 1966. Divided and this application May 25, 1966, Ser. No. 552,965
10 Claims. (Cl. 303—12)

ABSTRACT OF THE DISCLOSURE

A vacuum pressure control valve device comprising a movable abutment, subject on its respective opposite sides to a control fluid pressure and the force of a spring, for actuating a cam device to control the degree of unseating of a valve from its seat thereby to vary the rate of admission of air at atmospheric pressure into a vacuum pressure control communication whereby the degree of sub-atmospheric pressure therein is regulated according to the control fluid pressure.

*Background of the invention*

This application is a division of Patent 3,272,563 issued Sept. 13, 1966, to Harry C. May and assigned to the assignee of the present invention. In the aforesaid patent there is disclosed a multi-unit locomotive exhauster control appaartus, wherein each unit is provided with an exhauster and with a fluid pressure operated valve device for controlling a communication between the respective exhauster and the vacuum brake pipe on the locomotive units and cars, which valve device is operative to regulate the vacuum pressure or degree of sub-atmospheric pressure supplied from the respective exhauster to the vacuum train brake pipe. The specific features of this fluid pressure operated vacuum pressure control valve device constitute the present invention.

More specifically, the present invention comprises a novel vacuum pressure control valve device comprising a movable abutment, subject on its respective opposite sides to a control fluid pressure and the force of a spring, for actuating a cam device to control the degree of unseating of a valve from its seat thereby to vary the rate of admission of air at atmospheric pressure into a vacuum pressure control communication, such as, for example, a vacuum brake pipe on a train of cars, whereby the vacuum pressure or degree of sub-atmospheric pressure therein is regulated according to the control fluid pressure which, for example, may be the pressure in a brake pipe extending from end to end of a multi-unit locomotive.

In the accompanying drawing, the single figure is a schematic view, partly in section, showing the present invention.

*Description*

As shown in the drawing, the degree of sub-atmospheric pressure or vacuum in a pipe 1, which may be, for example, a train vacuum brake pipe, is controlled by a fluid pressure operated valve device 2 which is connected to the pipe 1 by a pipe 3 and to a vacuum reservoir 4 by a pipe 5. In order that fluid may be evacuated from the vacuum reservoir 4 to establish a sub-atmospheric pressure therein and also in the vacuum brake pipe 1, the reservoir 4 is connected to an exhauster device by a pipe 6.

To provide for the operation of the valve device 2 according to the degree of a control fluid pressure, this valve device is connected to the outlet or delivery port of any suitable manually operated self-lapping valve device 7 by a pipe 8. This manually operated self-lapping valve device 7 is provided with a supply port which is connected by a pipe 9 to a reservoir 10 which may be charged with fluid under pressure from a fluid compressor (not shown) via a pipe 11.

The fluid pressure operated valve device 2 comprises a casing 12 between the left-hand end of which and a cover member 13 is clamped the outer periphery of a movable abutment or diaphragm 14 which, in cooperation with the cover member 13, forms on one side of the diaphragm a control chamber 15. The control chamber 15 is connected to the self-lapping valve device 7 via the hereinbefore-mentioned pipe 8 and a correspondingly numbered passageway extending through the cover member 13 and the casing 12. The inner edge of the diaphragm 14 is clamped between a diaphragm follower 16 and an annular diaphragm follower plate 17 through which extends a screw-threaded stem 18 that is formed integral with the diaphragm follower 16 and which receives a nut 19 for forcing the follower plate 17 against the follower 16.

Formed integral with the right-hand side of the diaphragm follower 16 is an operating stem 20 that extends through a bore 21 in a boss 22 that is integral with the upper wall of the casing 12 and extends downward therefrom into a chamber 23 within the casing. The chamber 23 is open to atmosphere through an insect excluder device 24 carried by a bottom cover 25 that is secured to the bottom wall of the casing 12 by any suitable means (not shown) to close an opening 26 in this bottom wall. Disposed in the chamber 23 coaxial with the operating stem 20 is a cam carrier 27 that is supported by a pair of spaced-apart identical rollers 28 which are respectively rotatably mounted on a pair of parallel spaced-apart shafts 29 and 30 that have their respective opposite ends anchored in the opposite vertical walls of the casing 12.

The cam carrier 27 is rectangular in shape and has a recess 31 formed in its upper face, as by a milling operation. The width of the recess 31 is less than the width of the cam carrier 27 so that the milling operation forms two upstanding parallel spaced-apart walls in which are anchored the opposite ends of a pin 32 on which is pivotally mounted adjacent one end thereof a cam element 33. Extending through the cam carrier 27 and opening into the recess 31 is a bore 34 into which is press-fitted a bushing 35 that has a screw-threaded bore in which is carried an adjusting screw 36 that supports the left-hand end of the cam element 33. Disposed above the cam element 33 is a cam lever 37 which is pivotally mounted adjacent its right-hand end on a pin 38 that has its opposite ends anchored in the opposite vertical walls of the casing 12. The cam lever 37 is also rectangular in shape and has a recess 39 formed in its lower face which extends inward from its left-hand end and terminates adjacent the pin 38 on which the cam lever is pivotally mounted. The width of the recess 39 is less than the width of the cam lever 37 so that when the recess 39 is formed in the cam lever 37, as by a milling operation, the cam lever will be provided with two downwardly extending parallel spaced-apart walls in which are anchored in the opposite ends of a first pin 40 on which is rotatably mounted a roller 41 that is adapted to roll along a cam surface 42 formed on the cam element 33 as this cam element is moved in either a right-hand or a left-hand direction from the position in which it is shown in the drawing, in a manner hereinafter described in detail.

The cam lever 37 is provided with a short slot 43 which extends inward from the left-hand end thereof, the width of which is substantially the same as the distance between the two downwardly extending parallel spaced-apart walls at the opposite sides of the recess 39. Anchored in these two downwardly extended walls at a location that is substantially midway the length of the slot 43 is a second pin 44 on which is rotatably mounted a roller 45 upon which rests the lower end of a pusher sleeve 46 that extends through a bore 47 formed in a boss 48 that is integral with the upper wall of the casing 12 and extends down therefrom into the chamber 23.

The pusher sleeve 46 is provided with a bottom bore 49 and a coaxial counterbore 50 that extends inward from the upper end thereof, which upper end is disposed in a chamber 51 that is formed in a valve body or housing 52 that is secured by any suitable means (not shown) to an exterior flat surface 53 formed on the upper wall of the casing 12. Slidably mounted in the bottom bore 49 is the lower end of a valve pusher 54 that has a collar 55 formed at the upper end thereof and disposed in the counterbore 50. Interposed between the collar 55 and the bottom of the counterbore 50 and in surrounding relation to the valve pusher 54 is a spring 56 that is effective to normally bias the collar 55 against a snap ring 57 that is inserted in a groove formed in the wall of the counterbore 50 adjacent the upper end thereof.

The upper end of the valve pusher 54 is provided with a headed wear pin 58 the head of which abuts a corresponding head formed at the lower end of a valve tip 59 that is carried by a poppet-type valve 60 having a fluted stem 61 that is disposed in a bore 62 formed in the valve housing 52 and extending between the chamber 51 and a chamber 63 formed in the upper end of the valve housing 52.

Disposed in the chamber 63 and interposed between the valve housing 52 and the upper end of the fluted stem 61 is a spring 64 that is effective to bias the valve tip 59 into contact with the head of the headed pin 58 and the valve 60 in a direciton away from an annular valve seat 65 formed at the lower end of the bore 62.

Opening into the chamber 63 is one end of a passageway 66 the opposite end of which is connected by a pipe bearing the same numeral to the outlet of an atmospheric air filter device 67 to the inlet of which is connected one end of a pipe 68 the opposite end of which is open to atmosphere. While the valve 60 is held unseated by the spring 64, the filter device 67 serves to remove contaminants from atmospheric air admitted to the chamber 51 into which opens one end of the pipe 5 and also one end of the pipe 3 that has its opposite end connected to the vacuum brake pipe 1.

The upper wall of the casing 12 has formed integral therewith a second boss 69 that extends downward therefrom, which boss is provided with a bore 70 that is coaxial with the bore 21 in the boss 22. Slidably mounted in the bore 70 is a carriage pusher 71 one end of which abuts the right-hand end of the cam carrier 27 and the opposite end of which is secured to a spring seat 72. A heavy spring 73 is interposed between the spring seat 72 and a plurality of annular shims 74 arranged in a stack in surrounding relation to a boss 75 formed on the left-hand side of a cover member 76 that is secured to the right-hand open end of the casing 12 by any suitable means (not shown).

In order to initially properly position the cam element 33, which is pivotally mounted on the movable cam carrier 27, with respect to the cam lever 37, which is pivotally mounted on the pin 38, the opposite ends of which are anchored in the opposite vertical walls of the stationary casing 12, the cover member 13 is provided with a bore 77 into the right-hand end of which is press-fitted a bushing 78 having intermediate its ends of collar 79 which rests against the cover member 13 at the right-hand end of the bore 77.

The bushing 78 is provided with a central internally screw-threaded bore 80 for receiving an adjusting screw 81 the right-hand end of which abuts the left-hand end of the screw-threaded stem 18 that is integral with the diaphragm follower 16. Intermediate its ends the screw-threaded bore 80 is provided with an internal annular groove in which is inserted an O-ring 82 that forms a seal with the adjusting screw 81 to prevent leakage of fluid under pressure from the control chamber 15 along the adjusting screw 81 to a chamber 83 formed by the cooperative relationship of the bushing 78, the wall of the bore 77 and a cylindrical head 84 formed integral with the adjusting screw 81. The cylindrical head 84 is provided with a peripheral annular groove into which is inserted an O-ring 85 that forms a seal with the wall surface of the bore 77 to prevent leakage of the fluid under pressure from the chamber 83 to atmosphere.

The cylindrical head 84 is further provided with a screw-driver slot 86 for receiving the end of a screwdriver the rotation of which in one direction is effective to move the cam carrier 27 and cam element 33 via the stems 18 and 20 that are integral with the diaphragm follower 16 in the direction of the right-hand against the yielding resistance of the heavy spring 73 until a reference mark (not shown) formed on the cam element 33 is in alignment with a corresponding reference mark (not shown) formed on the cam lever 37. It will be understood from the foregoing that rotation of the screwdriver in the opposite direction so that the adjusting screw 81 is moved away from the screw-threaded stem 18 renders the heavy spring 73 effective to move the cam carrier 27 and cam element 33 via the carriage pusher 71 in the direction of the left-hand so that the left-hand end of the stem 18 is maintained in contact with the right-hand end of the adjusting screw 81. Thus, if when initially assembled, the reference mark formed on the cam element 33 is either on the left-hand side or on the right-hand side of the reference mark on the cam lever 37, the cam carrier 27 and cam element 33 carried thereby can be moved in the proper direction to bring the reference mark on the cam element 33 into alignment with the corresponding reference mark on the cam lever 37.

It should be noted at this time that the number of shims 74 disposed between the right-hand end of the heavy spring 73 and the cover member 76 must be such that, when the cam carrier 27 is adjusted to the position in which the reference mark on the cam element 33 carried thereby is in alignment with the reference mark on the cam lever 37 the compressed value of the heavy spring 73 is equal to the effective area of the diaphragm 14 in square inches multiplied by fifty pounds per square inch, since it is desired that the fluid pressure operated vacuum control valve device 2 controls variations in the subatmospheric pressure in the vacuum brake pipe 1 from zero inches of mercury (atmospheric pressure) to 20 inches of mercury accordingly as the pressure in the pipe 8 and chamber 15 is varied from fifty pounds per square inch to seventy pounds per square inch, it being understood that while the diaphragm 14, cam carrier 27, and cam lever 37 occupy the position shown in the drawing, the valve 60 is biased away from the annular valve seat 65 by the spring 64 to its fully opened position so that atmospheric air admitted through the filter device 67 will increase the subatmospheric pressure in the vacuum brake pipe 1 to atmospheric pressure.

The valve device 7 is a self-lapping type of valve device having a self-lapping unit of any well-known construction which, while a valve operating handle 87 occupies a maximum pressure position, will be actuated to supply fluid under pressure from the reservoir 10 that is connected to the valve device 7 by the pipe 9, to the pipe 8 which is connected to the chamber 15 so that the fluid under pressure thus supplied to the pipe 8 and the chamber 15 increases the pressure therein to a preselected normal charge value.

The valve device 7 has a pressure reduction zone that extends between its maximum pressure position and a minimum reduced pressure position so that as an operator moves the handle 87 arcuately from its maximum pressure position into its pressure reduction zone an extent corresponding to the degree of pressure desired in the pipe 8 and chamber 15, fluid under pressure will be exhausted from the pipe 8 and chamber 15 proportional to the amount of arcuate movement of the handle 87 into this zone, thus providing a graduated reduction of pressure in the chamber 15.

*Operation*

Assume initially that the reservoir 10 is charged with fluid to a chosen pressure such as, for example, one hundred pounds per square inch, that handle 87 of the manually operative self-lapping valve device 7 is in its maximum pressure position; that the self-lapping unit of the valve device 7 has been adjusted to provide via pipe and corresponding passageway 8 a desired normal charged pressure in the chamber 15 of the fluid pressure operated valve device 2 which normal charged pressure may be, for example, seventy pounds per square inch; and that the exhauster is operating to provide a chosen subatmospheric pressure in the vacuum reservoir 4, the chamber 51 in the fluid pressure operated valve device 2, and the vacuum pipe 1 which chosen sub-atmospheric pressure may be, for example twenty inches of mercury (Hg). It should be understood that when the above-mentioned desired normal pressure is present in the chamber 15 of the fluid pressure operated valve device 2, the valve 60 of this valve device occupies its minimum open position to allow a minimum rate of flow of air from atmosphere to the chamber 51 via the pipe 68, filter device 67, pipe and passageway 66, chamber 63 and bore 62, and thence from chamber 51 to the vacuum pipe 1 via the pipe 3, and to the vacuum reservoir via the pipe 5.

Let it now be supposed that an operator desires to increase the sub-atmospheric pressure in the vacuum pipe 1 to a desired higher sub-atmospheric pressure. To do so, he will manually move the handle 87 of the self-lapping valve device 7 arcuately from its maximum pressure position into its pressure reduction zone to an extent corresponding to the desired degree of increase in the sub-atmospheric pressure in the vacuum pipe 1. When the handle 87 is moved into its pressure reduction zone, the self-lapping unit of the valve device 7 is operated to vent fluid under pressure from the pipe 8 and correspondingly from passageway 8 and the chamber 15 to cause a reduction of pressure in the chamber 15.

The reduction of the pressure in the chamber 15 of the fluid pressure operated valve device 2 renders the spring 73 effective, via the carriage pusher 71, to shift the cam carrier 27 and cam element 33 pivotally mounted thereon in the direction of the left-hand, it being understood that the cam carrier 27 is supported by the rollers 28 so that the left-hand end of the cam carrier 27 remains in abutting contact with the right-hand end of the operating stem 20 to thereby shift this stem and the diaphragm follower 16 in the direction of the left-hand.

As the cam carrier 27 and the cam element 33 are thus shifted in the direction of the left-hand, spring 64 is rendered effective to move the valve 60 downward away from the valve seat 65 so that an increased quantity of air from the atmosphere flows to the chamber 51 via the pipe 68, filter device 67, pipe and corresponding passageway 66, chamber 63, along the fluted stem 61 of the valve 60 and past this unseated valve. As the valve 60 is thus moved downward by the spring 64, it is effective via the valve tip 59, wear pin 58, valve pusher 54, spring 56, pusher sleeve 46, roller 45, pin 44, and cam lever 37 to maintain the roller 41 rotatably mounted on the pin 40 that is supported by the cam lever 37 in contact with the cam surface 42 on the cam element 33 so that the roller 41 rides down the cam surface 42 as the cam element 33 and cam carrier 27 are moved in the direction of the left-hand by the spring 73 until the reduced pressure in the chamber 15 and acting on the effective area of the diaphragm 14 balances the force of the spring 73.

As the valve 60 is moved downward away from the valve seat 65, the filtered air from the atmosphere thus admitted to the chamber 51 flows to the vacuum brake pipe 1 via the passageway and corresponding pipe 3.

Furthermore, as the valve 60 of the fluid pressure operated valve device 2 moves away from the valve seat 65 to increase the degree of opening of this valve in response to the reduction of pressure in the chamber 15 resulting from the operator moving the handle 87 of the valve device 7 to a position in its pressure reduction zone corresponding to the desired degree of increase in the sub-atmospheric pressure in the vacuum pipe 1, more air from the atmosphere is admitted past the valve 60 per unit of time or per second, but the amount of air from the atmosphere flowing past the valve 60 decreases as the sub-atmospheric pressure in the vacuum pipe 1 increases. When the sub-atmospheric pressure in the vacuum pipe 1 is increased to a value corresponding to the reduction in pressure effected in the chamber 15 of the fluid pressure operated valve device 2, the quantity of air flowing from the atmosphere past the valve 60 is equal to the quantity of air from the atmosphere that will be evacuated or exhausted by the exhauster. Therefore, the exhauster operates to evacuate or exhaust all of the air from the atmosphere that flows past the valve 60 to the chamber 51 in the fluid pressure operated valve device 2. Consequently, there will be no further increase in the sub-atmospheric pressure in the vacuum pipe 1.

It will be understood, of course, that the operator may move the handle 87 of the self-lapping valve device 7 arcuately to any position in its pressure reduction zone between its maximum pressure position and its minimum reduced pressure position to cause the valve 60 of the fluid pressure operated device 2 to be moved to a corresponding position with respect to its seat 65 whereupon the rate of flow of air from the atmosphere to the chamber 51 thus established by the valve 60 effects the establishment of a corresponding degree of sub-atmospheric pressure in the vacuum brake pipe 1. Therefore, as the handle 87 is moved from its maximum pressure position through its pressure reduction zone to its minimum reduced pressure position, the pressure in the chamber 15 of the valve device 2 is varied from a chosen maximum pressure, which, for example, may be seventy pounds per square inch, to a chosen minimum pressure, which, for example, may be fifty pounds per square inch. In consequence, the sub-atmospheric pressure in the vacuum pipe 1 is correspondingly varied from a chosen minimum sub-atmospheric pressure, which may be, for example, a high degree of vacuum of twenty inches of mercury (Hg), to atmospheric pressure or no degree of vacuum.

Having now described the invention, what I claim as new and desire to secure by Letters Patent is:

1. In combination:
  (a) a vacuum pipe,
  (b) an exhauster and a storage reservoir evacuated thereby,
  (c) a communication extending between the storage reservoir and said vacuum pipe,
  (d) a constantly open fluid pressure operated valve means disposed in said communication and operable in response to variations of a control fluid pressure for controlling evacuation of fluid under pressure from said vacuum pipe in response to evacuation of the storage reservoir by operation of said exhauster, said valve means being also operable to vary the amount of fluid admitted from the atmosphere to said vacuum pipe from a chosen maximum to a chosen minimum greater than zero accordingly as said control fluid pressure increases from a chosen minimum pressure to a chosen maximum pressure,
  (e) a source of fluid under pressure, and (f) a manually operable valve device for controlling the supply of fluid under pressure from said source to said fluid pressure operated valve means to effect the establishment thereon of said control fluid pressure and for controlling the release of said control fluid pressure to atmosphere to effect a reduction thereof.

2. The combination, as claimed in claim 1, further characterized in that said manually operable valve device is of the self-lapping type.

3. In combination:
 (a) an exhauster and a reservoir evacuated thereby,
 (b) a pipe,
 (c) a valve device having:
  (i) a casing having two coaxially related chambers therein with a shoulder therebetween, one of said chambers being constantly open to atmosphere and the other chamber communicating with said reservoir and said pipe,
  (ii) an annular valve seat formed on said shoulder,
  (iii) a poppet valve cooperating with said valve seat and movable in the said other chamber with respect thereto to vary the clearance between said valve and said valve seat from a chosen maximum to a chosen minimum greater than zero to vary the rate of admission of air at atmospheric pressure from said one chamber to said other chamber, and
  (iv) fluid pressure controlled means for varying the position of said valve with respect to said valve seat,
 (d) a source of fluid under pressure, and
 (e) valve means for controlling the supply of fluid pressure from said source to said fluid pressure controlled means.

4. The combination recited in claim 3, further characterized in that said poppet valve is unseated from said valve seat a minimum distance responsively to establishment of a maximum fluid pressure on the fluid pressure controlled means and is unseated from said valve seat a maximum distance responsively to establishment of a minimum fluid pressure on the fluid pressure controlled means.

5. A fluid pressure operated valve device comprising:
 (a) a casing having a first and a second chamber formed therein and connected by a passageway,
 (b) an annular valve seat formed at one end of said passageway,
 (c) a valve operable toward and away from said seat to vary the rate of flow of fluid under pressure from said first chamber to said second chamber,
 (d) a lever pivoted at one end on said casing and operatively connected at its opposite end to said valve,
 (e) a roller carried by said lever intermediate the ends of said lever,
 (f) a longitudinally movable carriage member,
 (g) a cam pivotally mounted on said carriage member and having a cam surface in contact with said roller,
 (h) a spring yieldingly resisting movement in one direction of said carriage member, and
 (i) a movable abutment operably connected to said carriage member for effecting movement thereof against the yielding resistance of said spring in response to the supply of fluid under pressure to one side of said abutment to cause movement of said valve toward said annular valve seat,
 (j) the contour of said cam surface being such as to impart movement of said valve toward said annular valve seat to provide a selected rate of flow of fluid under pressure past said valve as the pressure of fluid active on said one side of said abutment varies from a chosen minimum to a chosen maximum.

6. A fluid pressure operated valve device, as claimed in claim 5, further characterized by means for manually adjusting said cam to different fixed positions with respect to said carriage member thereby to correspondingly vary the movement of said valve toward and away from said annular valve seat responsively to movement of said abutment.

7. A fluid pressure operated valve device, as claimed in claim 5, further characterized by manually operated means for effecting longitudinal movement of said carriage member and cam pivotally mounted thereon with respect to said roller.

8. A fluid pressure operated valve device, as claimed in claim 5, further characterized by a first yieldable means interposed between said lever and said valve, and by a second yieldable means biasing said valve in a direction away from said annular valve seat.

9. A fluid pressure operated valve device, as claimed in claim 5, further characterized in that said carriage member is movably supported by a pair of parallel spaced-apart rollers.

10. A fluid pressure operated valve device, as claimed in claim 5, further characterized in that said first chamber in said casing is open to atmosphere whereby said valve controls the rate of flow of fluid from the atmosphere to said second chamber accordingly as said valve is moved by said cam and lever toward and away from said valve seat as said carriage member is moved longitudinally in one direction or in an opposite direction in response to variations in pressure of fluid acting on said abutment.

References Cited

UNITED STATES PATENTS 2,629,638    2/1953    Snyder _____ 303—40
2,926,966    3/1960    Swander _____ 303—31 X DUANE A. REGER, *Primary Examiner.*